United States Patent [19]

Takahashi

[11] 3,712,452
[45] Jan. 23, 1973

[54] PAN TRANSFER DEVICE FOR BAKING OVEN

[76] Inventor: Katsushi Takahashi, No. 1021, Miyato, Asaka-shi, Saitama-ken, Japan

[22] Filed: April 28, 1971

[21] Appl. No.: 138,212

[30] Foreign Application Priority Data

May 8, 1970  Japan ................................. 45/38685

[52] U.S. Cl. ..................................... 198/34, 198/20
[51] Int. Cl. ............................................ B65g 47/26
[58] Field of Search ......................... 198/34, 27, 20

[56] References Cited
UNITED STATES PATENTS 3,155,222   11/1964   Stremke .......................... 198/34

Primary Examiner—Richard E. Aegerter
Attorney—Stevens, Davis, Miller & Mosher

[57] ABSTRACT

A pan transfer device for baking oven operable to make a spacing between two successive baking pans being transferred on a transfer member larger than that between two successive baking pans just taken out of the baking oven by lifting upward and shifting forward the baking pan to a stationary platform of higher level at one end of the transfer conveyor remote from the baking oven.

3 Claims, 2 Drawing Figures 3,712,452

PAN TRANSFER DEVICE FOR BAKING OVEN

DESCRIPTION OF THE PRIOR ART

In the prior art baking oven, particularly in case of the baking oven of tunnel type, a separate transfer mechanism, such as a chain conveyor, is provided, which will be operated at a speed greater than that of another chain conveyor or remover conveyor for taking the baking the baking pan directly out of the baking oven, so that any one of baking pans will not interfere with the other, in case of transferring the baking pan from the baking oven to desired poistion. However, the baking pan may be upset or shaken down from the conveyor due to the difference of speed, when it is transferred from the remover to the transfer conveyor. Various kind of devices or mechanism are provided to operate the transfer conveyor faster than the remover conveyor in order to avoid such difficulties due to the difference of speed. Still, it is very hard to prevent the baking pan completely from being upset or shaken down from the conveyor, despite the complexity of the structure of transfer mechanism. On the other hand, if there is no difference of speed between transfer and remover conveyor, the preceding and successive baking pan will be maintained at a constant spacing at all times. And hence, the succeding baking pan will run into the preceding one, should some trouble occur to the latter. However, if a substantially large spacing is provided between two successive baking pans, the size of the whole transfer mechanism will become unduly large, thus rendering the initial cost higher and reducing the efficiency of operation. As described hereinabove, no satisfactory system could not be obtained in terms of the structure and economy, even if the transfer and remover conveyor are operated at the same speed or at the different speed.

SUMMARY OF THE INVENTION

The present invention has been devised to overcome the dificiency of the prior art transfer system for the baking oven. In the present invention, the transfer conveyor, which is located adjacent to the remover conveyor at the outlet end of the baking oven, is driven at the same speed as that of the remover conveyor, and the baking pan placed on the transfer conveyor is lifted upwardly and shifted forwardly onto a stationary platform which is located at the level substantially higher than the surface of upper run of the transfer conveyor, while the baking pan is being transferred on the transfer conveyor so as to space one baking pan from the other at a spacing substantially larger than that of two successive baking pans just transferred from the remover to the transfer conveyor.

It is object of the present invention to provide the pan transfer device for baking oven operable to lift upwardly and push forwardly the baking pan onto the stationary platform at higher level, while it is being transferred on the transfer conveyor so as to prevent the baking pan from being interfered with the succeeding one.

It is another object of the present invention to provide the pan transfer device for baking oven which will transfer the baking pan just taken out of the baking oven readily to the transfer conveyor without causing the baking pan to be upset or shaken unduly.

It is further object of the present invention to provide the pan transfer device for the baking oven which is rugged and simple in construction without rendering the whole structure unduly large.

According to the present invention, there is provided a pan transfer device for baking oven, comprising a remover conveyor located at outlet end of the baking oven, a transfer conveyor located adjacent to and aligned with said remover conveyor and operated at a speed same as that of the remover conveyor and including a plurality of parallel running parts spaced one from the other, a lifter means including a plurality of elongated lifting members each adapted to be interposed into a spacing between said plurality of said running parts of said transfer conveyor and driven in a circular orbit, and a stationary platform fixedly mounted on a frame of the device adjacing to one end of said lifter means and having upper surface thereof located at a level higher than that of said running parts of said transfer conveyor.

BRIEF DESCRIPTION OF DRAWING

Now, one preferable embodiment according to the present invention will be described hereinafter in detail by way of example with reference to accompanying drawings, in which.

DESCRIPTION OF THE PREFERRED EMBODIMENTS

Figure 1:
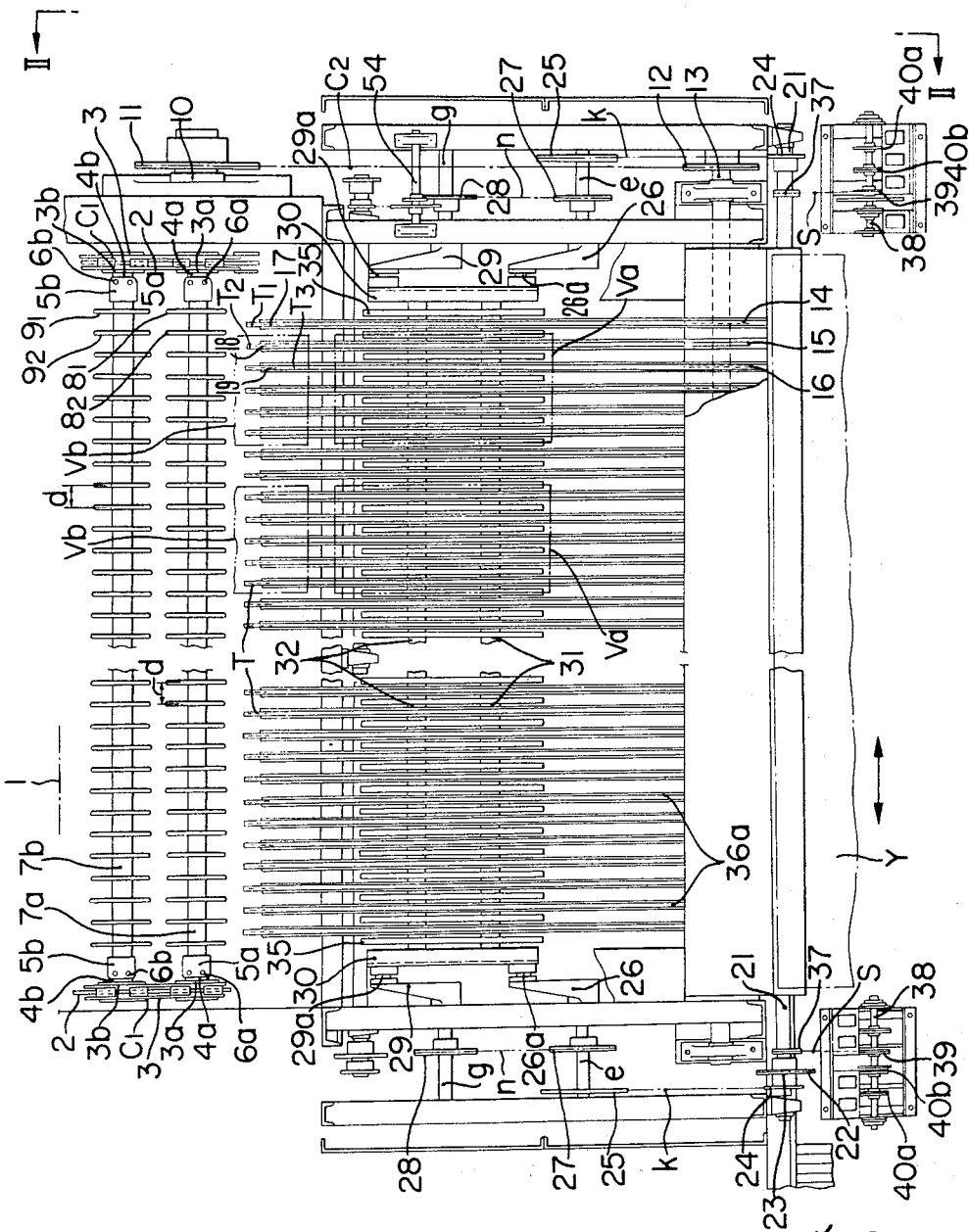
FIG. 1 is a plan view showing the essential parts of one embodiment according to the present invention.

Referring to drawings, particularly FIG. 1, a remover conveyor $C_1$ is shown, which is located adjacent to the outlet end 1 of the baking oven. The remover conveyor $C_1$ includes a pair of chains 3, 3 each trained about a pair of sprocket wheels 2, 2. Holding blocks 5a, 5b are connected to two different pin link plates 3a, 3b respectively of the chain 3, 3 by means of connecting pieces 4a, 4b respectively, which are clamped to the holding blocks 5a, 5b by means such as bolts 6a, 6b. Metallic pipes 7a, 7b of square cross-section are connected to the holding blocks 5a, 5b respectively at both ends thereof. Suitable number of grid members $8_1$, $8_2$, $9_1$, $9_2$ are mounted on the pipes 7a, 7b respectively at a predetermined spacing $d$ so as to receive a large number of baking pans thereon in longitudinal or transverse array. A sprocket wheel 11 is fixedly mounted on a driving shaft 10 at one end thereof, on which the above-mentioned sprocket wheel 2 is mounted. An endless chain $C_2$ is trained over the sprocket wheel 11 and another sprocket wheel 12 which is located remote from the baking over (lower part in FIG. 1).

A transfer conveyor T including a plurality of parallel narrow endless chain conveyors $T_1$, $T_2$, $T_3$ - - - is provided so to have one end thereof located oppositely to the remover conveyor $C_1$ (FIG. 1). Each endless chain conveyor $T_1$, $T_2$, $T_3$ - - - is trained about sprocket wheels 14, 15, 16 - - - mounted on the shaft 13 and each having the same size as that of the sprocket wheel 12 and other sprocket wheels 17, 18, 19 - - - - - located adjacent to the remover conveyor $C_1$. The endless chain conveyors $T_1$, $T_2$, $T_3$ - - - are spaced one from each other for the reason to the described hereinbelow, and are driven at the same speed as that of the remover conveyor $C_1$ by means of the shaft 13.

Figure 2:
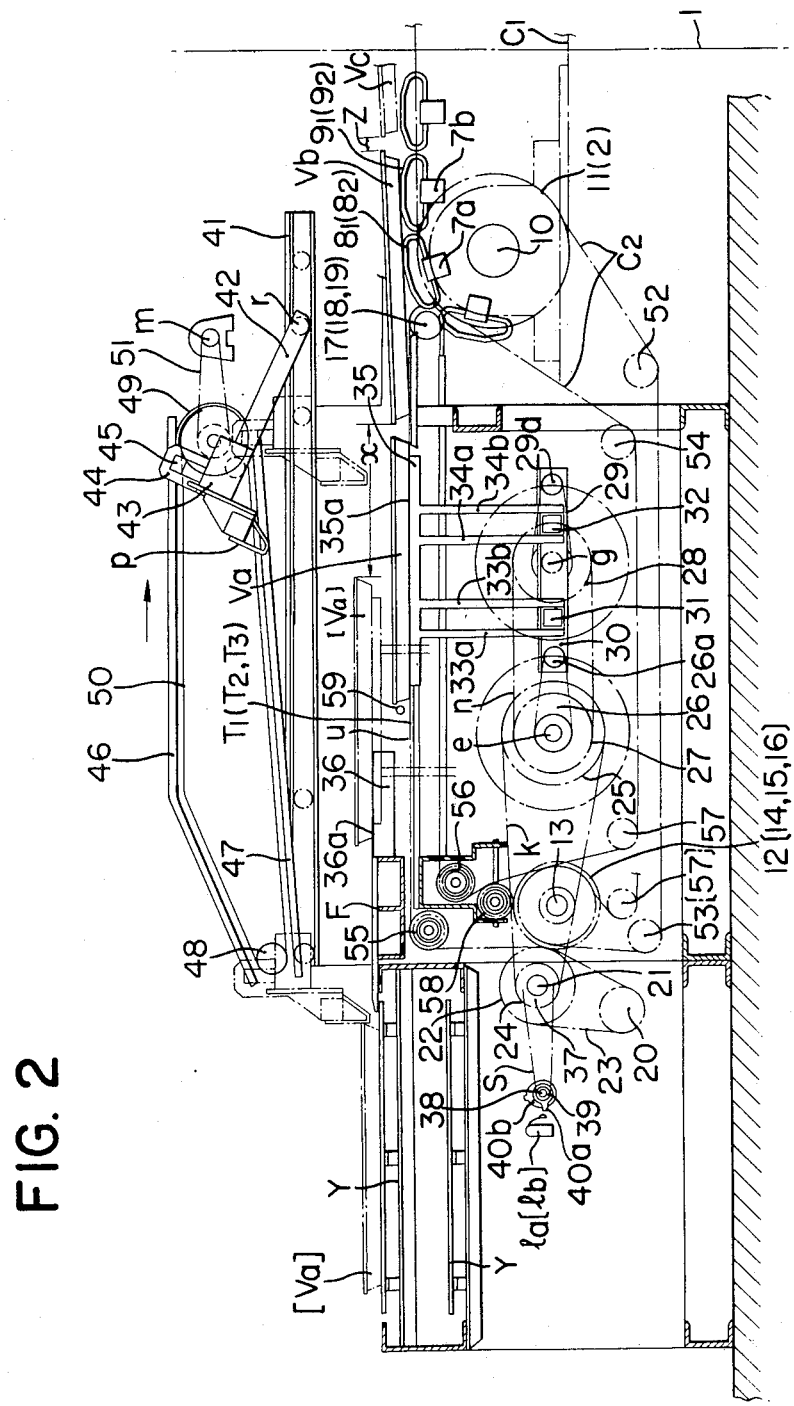
FIG. 2 is a side elevation view showing the essential parts taken line II—II in FIG. 1.

As shown in FIG. 2 an endless chain 23 is trained about a driving sprocket wheel 20 which is driven by a motor (not shown) and a sprocket wheel 22 mounted on a rotating shaft 21. Another endless chain K is trained around a sprocket wheel 24 fixedly mounted on the rotating shaft 21 and another sprocket wheel 25 provided on a shaft 3 located in the side closer to the remover conveyor $C_1$. A bent swinging arm 26 is mounted on the shaft e having the sprocket wheel 25 mounted thereon (FIG. 1). An endless chain n is trained around a sprocket wheel 27 mounted on the rotating shaft e and another sprocket wheel 28 mounted on a rotating shaft g which is located in the side closer to the remover conveyor $C_1$. The sprocket wheel 28 has the same size as that of the sprocket wheel 27. Another bent swinging arm 29 is mounted on the rotating shaft g at one end thereof. A support member 30 is rotatably mounted on pins 26a and 29a respectively provided on the above-mentioned swinging arms 26 and 29 at outer ends thereof. A pair of metallic pipes 31, 32 of square cross-section are connected to the support members 30, at both ends thereof. A lifter means having a horizontal top member 35 and four vertical legs 33a, 33b, 34a, 34b connected together to the horizontal top member 35 at upper ends thereof, is fixedly mounted on the above-mentioned metallic square pipes 31, 32 with lower ends of the vertical legs welded to the latter. The lifter means is constructed such that the upper surface 35a of the horizontal top member 35 will be flush with upper surface u of the transfer conveyor chain $T_1$, $T_2$, $T_3$ - - - , when the pins 26a, 29a are horizontally aligned with both shafts e and g as shown in FIG.2. A large number of lifter means are mounted in parallel on both square pipes 31, 32 such that each one lifter means will be inserted into a space between two adjoining transfer conveyor chains $T_1$ and $T_2$ and so on. It will be noted from FIG.2 that the horizontal top member 35 of the lifter means will be raised above and lowered below the top surface u of the transfer conveyor $T_1$, $T_2$, $T_3$ - - - when both swinging arms 26 and 29 are rotated respectively by the shaft e and g. A stationary platform 36 is fixedly mounted on the frame F of machine the above the rotating shaft 21, such that the upper surface 36a of the platform 36 will be at a level higher than the upper edges of baking pans Va, Vb, Vc - - - placed on the upper surface u of the transfer conveyor $T_1$, $T_2$, $T_3$ - - - , and is extended at one end toward the remover conveyor $C_1$, as shown in FIG.2.

An endless chain s is trained about a sprocket wheel 37 mounted on the rotating shaft 21 and another sprocket wheel 39 mounted on another rotating shaft 38. Cam members 40a, 40b are mounted on the rotating shaft 38 so as to engage with limit switches 1a, 1b respectively, thereby causing a prime mover driving the sprocket wheel 20 to be energized or deenergized.

As shown in FIG.2, a horizontal conveyor Y is provided adjacent to the stationary platform 36 so as to transfer the baking pans Va, Vb, Vc - - - - - in a direction perpendicular to the plane of this drawing from the stationary platform 36.

A pair of channel - shaped guide rails 41 are mounted on the upper part of the machine frame so as to extend from the stationary platform 36 to the remover conveyor $C_1$ (FIG.2). A swinging arm 42, having a roller r slidably engaged with the channel-shaped guide rail 41 at the lower end thereof, is provided with a head block 43 having a pusher member p depending thereon. The head block 43 is also provided with an inverted U-shaped fitting connected thereto. A framework consisting of a pair of substantially parallel rods 46, 47 and having a pair of sprocket wheels 48, 49 mounted thereon is mounted on the machine frame above the above-mentioned guide rail 41. An endless chain 50 is trained about both sprocket wheels 48 and 49. The sprocket wheel 49 is driven by a chain 51 which is in turn driven by a motor m. A lug piece 45 is connected to a link of the above-mentioned chain 50 at one end and inserted into the inverted U-shaped fitting at the other end. Therefore, the swinging arm 42 having a pusher member P will be reciprocated horizontally with its lower end guided by the guide rail 41. As shown in FIG.2, suitable guide wheels 52, 53, 54 are provided for the driving chain $C_2$, and guide wheels 55 and 56 for the transfer conveyors $T_1$, $T_2$, $T_3$ - - - . Chain wheels 57, 58 are provided for adjusting the tension of the driving chain $C_2$ and the transfer conveyors $T_1$, $T_2$, $T_3$ - - - . A photoelectric transducer 59 is provided for detecting a baking pan which is upset or deviated from regular its normal position.

In operation, the baking pans Va, Vb, Vc taken out of the baking oven on the grid member $8_1$, $8_2$, $9_1$, $9_2$ of the remover conveyor $C_1$ will be delivered to the transfer conveyor $T_1$, $T_2$, $T_3$ - - - , which are driven at the same speed as that of the remover conveyor $C_1$, and transferred toward the stationary platform 36. At this time, the support member 30, hence the lifter means will be lifted upwardly from the position shown in full line in FIG.2 by action of the rotating shaft 21 through the sprocket wheel 25, the chain n and the sprocket wheel 28. Accordingly, the baking pans Va, Vbm Vc - - - being transferred on the transfer conveyor $T_1$, $T_2$, $T_3$ - - - will be raised up to the position shown in phanton line in FIG.2 and placed on the stationary platform 36, since a horizontal top member 35 will follow a circular orbit. In this condition, the rotating shaft 21 will be stopped from running by action of the limit switch which is actuated by the cam member 40b. On the other hand, the endless chain 50 will be driven in a direction of arrowhead in FIG.2 by another motor m through the chain 51 and the sprocket wheel 49. Hence, the lug pieces 45 mounted on the swinging arm 42 will be moved from the position shown in full line to the position in phanton line, thereby causing the pusher member p to be moved in a direction of the arrowhead with its roller r guided by the guide rail 41. Then, the pusher member p will push the baking pans Va, Vb, Vc, - - - placed on the stationary platform 36 at one end (righthand end in FIG.2) so as to shift those baking pans to the conveyor Y. The baking pans Va, Vb, Vc - - - transferred to the conveyor Y will be conveyed to the desired position. The pusher member p will be brought toward the rod 46 by action of the endless chain 50. Simultaneously, the cam member 40a will actuate the switch to start the rotation of the rotating shaft 21, thereby bringing the lifter means back to the initial position in full line so as to repeat the same operation.

In case of the baking pans $Va$, $Vb$, $V$ - - - being misaligned on the transfer conveyor $T_1$, $T_2$, $T_3$ - - - or not placed on the stationary platform 36, or in danger of being upset or shaken down, the photoelectric transducer 59 will inform the operator of this situation.

In this manner, the baking pans $Va$, $Vb$, $Vc$ - - - delivered on the grid members $8_1$, $8_2$, $9_1$, $9_2$ will be continuously and automatically transferred at a constant spacing by repeating the operation as described hereinabove. Since the baking pans $Va$, $Vb$, $Vc$ - - - are lifted and shifted to the stationary platform 36, while they are being transferred by the transfer conveyor $T_1$, $T_2$, $T_3$ - - - , the spacing X between the above-mentioned baking pans and following ones will be made greater than the spacing Z between two baking pans just placed on the transfer conveyor. Therefore, the baking pans on the transfer conveyors $T_1$, $T_2$, $T_3$ - - - will be prevented from mutual interference, thereby improving the efficiency of transferring of the baking oven. Further, the remover and transfer conveyors are operated at the same speed, the baking pans will not be upset or shaken down, while they are shifted from the removed conveyor to the transfer conveyor, thereby enabling the transfer operation to be carried out smothly. The whole structure will become compact and require no large space to install it. Because of the simple structure, the device is rugged and inexpensive to construct, and there will be little or no chance of malfunction.

What is claimed is:

1. A pan transfer device for baking ovens, comprising: a remover conveyor located at the outlet end of the baking oven, a transfer conveyor located adjacent to and aligned with said remover conveyor and operated at the same speed as that of the remover conveyor and including a plurality of parallel running parts spaced one from the other, a lifter means including a plurality of elongated lifting members each adapted to be interposed into a space between said plurality of said running parts of said transfer conveyor and driven in a circular orbit, swinging arm means having a roller rotatably engaged with a guide rail member located above said lifter means, pusher means provided on a head block fixedly mounted on said swinging arm means, endless chains each having a lug piece made integral with said pusher means connected thereto, a framework for guiding said endless chains, and a stationary platform fixedly mounted on a frame of the device adjacent to one end of said lifter means and having upper surface thereof located at a level higher than that of said running parts of said transfer conveyor.

2. A pan transfer device for baking ovens, comprising:
   a remover conveyor located at the outlet end of a baking oven;
   a transfer conveyor located adjacent to and aligned with said remover conveyor and operated at the same speed as that of the remover conveyor, said transfer conveyor including a plurality of parallel running parts spaced one from the other;
   a lifter means including a plurality of elongated lifting members each adapted to be interposed into a spacing between said plurality of said running parts of said transfer conveyor and driven in a circular orbit;
   a stationary platform fixedly mounted on a frame of the device adjacent to one end of said lifter means and having an upper surface thereof located at a level higher than that of said running parts of said transfer conveyor;
   an endless chain located above said lifter means and stationary platform;
   a swinging arm connected to the said chain; and
   pusher means fixed to said swinging arm for pushing baking pans from said lifter means onto said stationary platform.

3. A pan transfer device for baking ovens, comprising:
   a remover conveyor located at the outlet end of a baking oven;
   a transfer conveyor located adjacent to and aligned with said remover conveyor and operated at the same speed as that of the remover conveyor, said transfer conveyor including a plurality of parallel running parts spaced one from the other;
   a lifter means including a plurality of elongated lifting members, each adapted to be interposed into a spacing between said plurality of said running parts of said transfer conveyor and driven in a circular orbit;
   support members constructed integrally with said lifter means;
   a pair of swinging arms fixedly mounted on each of said support members at both ends thereof;
   a pair of rotating shafts each having said swinging arms mounted thereon;
   driving wheels mounted on said rotating shafts;
   a stationary platform fixedly mounted on a frame of the device adjacent to one end of said lifter means and having an upper surface thereof located at a level higher than that of said running parts of said transfer conveyor; and
   means for moving baking pans from said lifter means to said platform.

* * * * *